United States Patent
Zhang

(10) Patent No.: US 8,265,246 B2
(45) Date of Patent: Sep. 11, 2012

(54) DEVICE AND METHOD FOR IMPLEMENTING A COLORING RING BACK TONE SERVICE AND DEVICE FOR ACQUIRING A COLORING RING BACK TONE FILE

(75) Inventor: Sifang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 875 days.

(21) Appl. No.: 12/390,123

(22) Filed: Feb. 20, 2009

(65) Prior Publication Data

US 2009/0214002 A1  Aug. 27, 2009

(30) Foreign Application Priority Data

Feb. 22, 2008 (CN) .......................... 2008 1 0008322
Mar. 3, 2008 (CN) .......................... 2008 1 0081641
Aug. 7, 2008 (WO) ................ PCT/CN2008/071924

(51) Int. Cl.
H04M 15/06 (2006.01)
H04M 1/64 (2006.01)
H04B 1/38 (2006.01)
H04L 29/06 (2006.01)

(52) U.S. Cl. ...................... 379/142.01; 84/609; 370/259; 379/87; 379/114.01; 379/201.01; 379/257; 379/373.01; 455/418; 455/567

(58) Field of Classification Search .................... 84/609; 379/87, 88.13, 114.01, 142.01, 201.01, 207.16, 379/215.01, 372, 373.01, 373.02, 88.12, 379/201.05, 202.01, 207.02, 257; 455/567, 455/418; 370/259

See application file for complete search history.

(56) References Cited

U.S. PATENT DOCUMENTS 6,094,587 A * 7/2000 Armanto et al. .............. 455/567

(Continued)

FOREIGN PATENT DOCUMENTS

CN  1335015 A  2/2002

(Continued)

OTHER PUBLICATIONS

3rd Office Action in corresponding Chinese Application No. 200810081641.9 (Dec. 5, 2010).

(Continued)

Primary Examiner — Gerald Gauthier
(74) Attorney, Agent, or Firm — Leydig, Voit & Mayer, Ltd.

(57) ABSTRACT

Embodiments of the invention provide a device and method for implementing a Coloring Ring Back Tone (CRBT) service and a device for acquiring a CRBT file. The device for implementing a CRBT service includes a first receiving module adapted to receive CRBT access information, a channel management module adapted to acquire a real-time CRBT file according to the CRBT access information, and a playing module adapted to play the real-time CRBT file. The method for implementing a CRBT service includes acquiring a real-time CRBT file customized by a subscriber according to CRBT access information and playing the real-time CRBT file to a calling subscriber. The device for acquiring a CRBT file includes a determination module adapted to determine whether to use a real-time CRBT service according to a subscribed CRBT identifier of a subscriber, a real-time CRBT information module adapted to determine real-time CRBT information according to a real-time CRBT identifier of the subscriber, and a real-time CRBT file module adapted to determine a real-time CRBT file according to the real-time CRBT information. Thus, a real-time update of a CRBT heard by the calling subscriber is realized through the embodiments of the invention.

18 Claims, 4 Drawing Sheets

U.S. PATENT DOCUMENTS

| | | | |
|---|---|---|---|
| 6,366,791 B1* | 4/2002 | Lin et al. | 455/567 |
| 6,456,601 B1* | 9/2002 | Kozdon et al. | 370/259 |
| 7,224,788 B1* | 5/2007 | Rhee et al. | 379/207.02 |
| 7,512,421 B2* | 3/2009 | Kim et al. | 455/567 |
| 7,613,287 B1* | 11/2009 | Stifelman et al. | 379/215.01 |
| 7,903,803 B2* | 3/2011 | Raju et al. | 379/202.01 |
| 7,940,909 B2* | 5/2011 | Yan | 379/201.05 |
| 8,019,054 B2* | 9/2011 | Davies | 379/88.12 |
| 8,027,444 B1* | 9/2011 | Martin et al. | 379/201.01 |
| 8,027,456 B1* | 9/2011 | Zhang et al. | 379/257 |
| 8,059,800 B1* | 11/2011 | Martin et al. | 379/114.01 |
| 8,081,751 B1* | 12/2011 | Martin et al. | 379/373.01 |
| 8,085,906 B2* | 12/2011 | Park et al. | 379/87 |
| 8,107,614 B2* | 1/2012 | Sobti et al. | 379/373.02 |
| 8,126,126 B2* | 2/2012 | Haley et al. | 379/201.01 |
| 2002/0110224 A1* | 8/2002 | Kovales et al. | 379/67.1 |
| 2005/0117726 A1* | 6/2005 | DeMent et al. | 379/142.01 |
| 2006/0026277 A1 | 2/2006 | Sutcliffe | |
| 2007/0121821 A1 | 5/2007 | Su | |
| 2007/0133760 A1* | 6/2007 | Cotignola et al. | 379/88.13 |
| 2007/0189474 A1* | 8/2007 | Cai | 379/142.01 |
| 2007/0211872 A1* | 9/2007 | Cai et al. | 379/142.01 |
| 2007/0245882 A1* | 10/2007 | Odenwald | 84/609 |
| 2007/0286372 A1* | 12/2007 | DeMent et al. | 379/142.01 |
| 2007/0286402 A1* | 12/2007 | Jacobson | 379/372 |
| 2008/0063168 A1* | 3/2008 | Haley et al. | 379/201.01 |
| 2008/0101554 A1 | 5/2008 | Rhee et al. | |
| 2008/0130841 A1 | 6/2008 | Pan et al. | |
| 2009/0143054 A1* | 6/2009 | Drescher et al. | 455/418 |
| 2009/0214002 A1* | 8/2009 | Zhang | 379/87 |
| 2010/0027776 A1* | 2/2010 | Stifelman et al. | 379/207.16 |

FOREIGN PATENT DOCUMENTS

| | | |
|---|---|---|
| CN | 1859488 A | 7/2003 |
| CN | 101026652 A | 8/2007 |
| CN | 101237488 A | 8/2008 |
| EP | 1 890 471 A1 | 2/2008 |
| EP | 2093475 A1 * | 8/2009 |
| KR | 2005-0046509 A | 5/2005 |
| KR | 1020050048225 A | 5/2005 |
| RU | 2303823 C2 | 7/2007 |
| WO | WO 2006/117777 A2 | 11/2006 |

OTHER PUBLICATIONS $1^{st}$ Office Action in corresponding Russian Application No. 2009106146 (Apr. 22, 2010).

Rejection Decision in corresponding Chinese Application No. 200810081641.9 (Mar. 23, 2011).

First Office Action in counterpart Chinese Application No. 200810081641.9, mailed Oct. 23, 2009.

Second Office Action in counterpart Chinese Application No. 200810081641.9, mailed Jul. 29, 2010.

Written Opinion in counterpart PCT Application No. PCT/CN2008/071924, mailed Nov. 6, 2008.

First Office Action in counterpart European Application No. 09153263.0-2414, mailed Oct. 1, 2009.

Notice to Submit a Response in counterpart Korean Application No. 10-2009-0014376, mailed Aug. 23, 2010.

* cited by examiner

DEVICE AND METHOD FOR IMPLEMENTING A COLORING RING BACK TONE SERVICE AND DEVICE FOR ACQUIRING A COLORING RING BACK TONE FILE

CROSS-REFERENCE TO RELATED APPLICATIONS

This application claims priority to Chinese Patent Application No. 200810008322.5, filed Feb. 22, 2008, Chinese Patent Application No. 200810081641.9, filed Mar. 3, 2008, and International Patent Application No. PCT/CN2008/071924, filed Aug. 7, 2008, all of which are hereby incorporated by reference in their entirety.

FIELD OF THE INVENTION

The invention relates to the field of network communication, and more particularly to a device and method for implementing a Coloring Ring Back Tone (CRBT) service and a device for acquiring a CRBT file.

BACKGROUND

A Coloring Ring Back Tone (CRBT) service is a service that enables a calling subscriber to hear a CRBT customized by a called subscriber. The called subscriber may search, through a network, for music or sound files provided by a service provider or operator that can be used as CRBTs, and customize certain music or sound files as his/her own CRBT. When the calling subscriber calls the called subscriber, the calling subscriber hears the music or sound file, which replaces the monotonic ring back tone heard when the CRBT service is not customized.

In the conventional art, when customizing a CRBT, the called subscriber must search for and download music or sound files that he/she is interested in before setting the music or sound files as the CRBT. The calling terminal can hear a different CRBT only after the called subscriber changes the CRBT he/she sets. Therefore, in the conventional CRBT service, the calling subscriber can hear a different ringing tone only after the called subscriber changes the ringing tone. Then, for the calling subscriber, the ringing tone is fixed and cannot be updated in real time. Next, the called subscriber must search for, download, and set a ringing tone for changing the ringing tone, which is a complicated operation.

SUMMARY

Embodiments of the invention provide a device and method for implementing a Coloring Ring Back Tone (CRBT) service and a device for acquiring a CRBT file, so as to implement a real-time update of the CRBT.

The embodiments of the invention provide a device for implementing a CRBT service. The device includes: (1) a first receiving module, adapted to receive CRBT access information; (2) a channel management module, adapted to determine a real-time CRBT file according to the CRBT access information; and (3) a playing module, adapted to play the real-time CRBT file.

The embodiments of the invention provide a method for implementing a CRBT service. The method includes the steps of (1) receiving CRBT access information; (2) determining a real-time CRBT file according to the CRBT access information; and (3) playing the real-time CRBT file to a calling subscriber.

In the embodiments of the invention, the CRBT file that the calling subscriber hears is updated in real time by playing the real-time CRBT file to the calling subscriber.

The embodiments of the invention provide another device for implementing a CRBT service, which is used in a process for playing a first CRBT file to a calling subscriber. The device includes (1) a receiving module, adapted to receive selection information sent by the calling subscriber; (2) a CRBT module, adapted to determine a second CRBT file to be played according to the received selection information; and (3) a playing module, adapted to play the second CRBT file to the calling subscriber.

The embodiments of the invention provide another method for implementing a CRBT service. The method includes the steps of (1) receiving selection information sent by a calling subscriber in a process for playing a first CRBT file to the calling subscriber; (2) determining a second CRBT file according to the selection information; and (3) playing the second CRBT file to the calling subscriber.

In the embodiments of the invention, the CRBT file that the calling subscriber hears is updated in real time by switching the played CRBT file in the process for playing the CRBT file to the calling subscriber.

The embodiments of the invention provide a device for acquiring a CRBT file. The device includes (1) a determination module, adapted to determine whether to use a real-time CRBT service according to a subscribed CRBT identifier of a subscriber; (2) a real-time CRBT information module, adapted to determine real-time CRBT information according to a real-time CRBT identifier of the subscriber; and (3) a real-time CRBT file module, adapted to determine a real-time CRBT file according to the real-time CRBT information.

In the embodiments of the invention, the CRBT that a calling subscriber hears may be updated in real time by acquiring the real-time CRBT file; besides, in the process for playing the CRBT, the played CRBT may be switched based on the selection information of the calling subscriber to implement the real-time update of the CRBT that the calling subscriber hears in another manner.

DETAILED DESCRIPTION

The technical schemes of the invention are further illustrated below in combination with accompanying drawings and specific embodiments.

Figure 1:
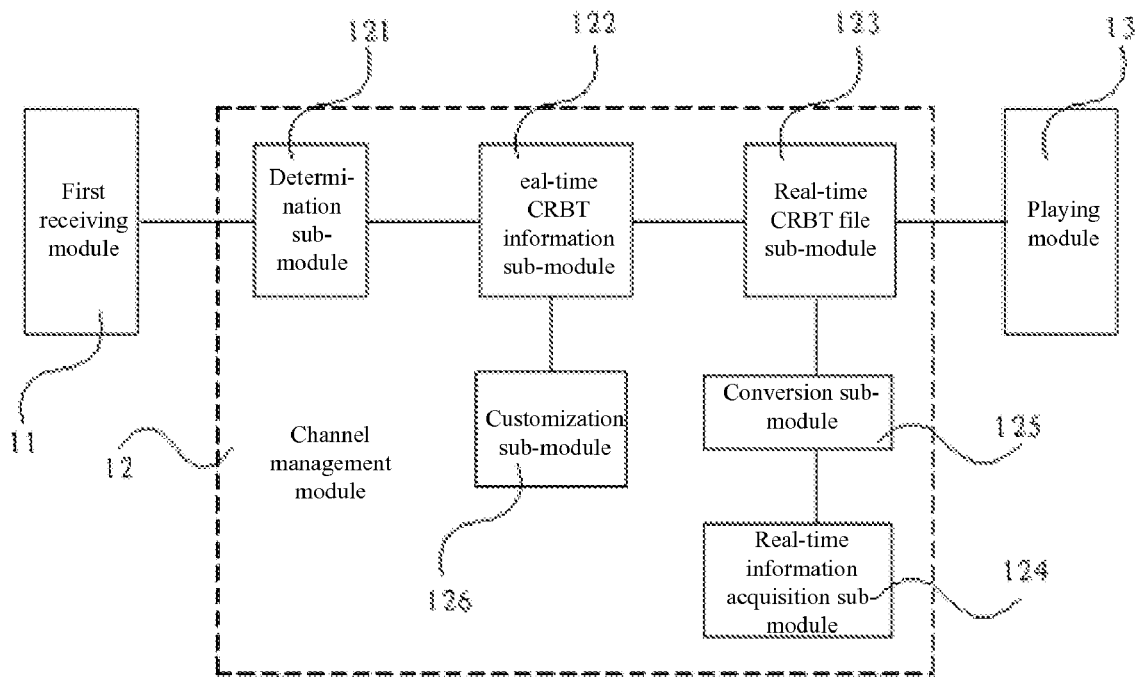
FIG. 1 is a schematic structural view of a device for implementing a Coloring Ring Back Tone (CRBT) service according to an embodiment of the invention.

FIG. 1 is a schematic structural view of a device for implementing a Coloring Ring Back Tone (CRBT) service according to an embodiment of the invention. The embodiment includes a first receiving module 11, a channel management module 12, and a playing module 13. The first receiving module 11 is adapted to receive CRBT access information. The channel management module 12 is adapted to determine a real-time CRBT file according to the CRBT access information. The playing module 13 is adapted to play the real-time CRBT file.

The CRBT access information may include a subscribed CRBT identifier of a called subscriber acquired from a home location register (HLR). A subscriber sets a customized service on the channel management module, for example, whether a called subscriber customizes a real-time CRBT service, a priority for a calling party and the called party to customize a real-time CRBT service, that is, whether the real-time CRBT service customized by the calling subscriber or that customized by the called subscriber has the higher priority, the real-time CRBT information customized by the calling party and the called party respectively, a play order of real-time CRBT files corresponding to the real-time CRBT information, and the like.

In particular, the channel management module 12 includes a determination sub-module 121, a real-time CRBT information sub-module 122, and a real-time CRBT file sub-module 123. The determination sub-module 121 is adapted to determine whether to use the real-time CRBT service and the priority for the calling subscriber and the called subscriber to customize a real-time CRBT according to the subscribed CRBT identifier of the called subscriber. The real-time CRBT information sub-module 122 is adapted to determine real-time CRBT information according to the priority for the calling subscriber and the called subscriber to customize the real-time CRBT. That is, acquire real-time CRBT information customized by the calling party when the calling party has a higher priority, and acquire real-time CRBT information customized by the called party when the called party has a higher priority. The real-time CRBT file sub-module 123 is adapted to store real-time CRBT files and determine the real-time CRBT file according to the real-time CRBT information, that is, acquire a calling real-time CRBT file corresponding to the real-time CRBT information customized by the calling subscriber when the calling party has a higher priority, and acquire a called real-time CRBT file corresponding to the real-time CRBT information customized by the called subscriber when the called party has a higher priority.

The channel management module 12 may further include a real-time information acquisition sub-module 124 and a conversion sub-module 125. The real-time information acquisition sub-module 124 is adapted to acquire real-time information from a real-time platform. The real-time platform may be a carrier such as a radio station, a TV station, or a website capable of providing real-time information. The real-time information includes news, weather forecasts, music, advertisements, and the like. The conversion sub-module 125 is adapted to convert the real-time information into a real-time CRBT file. As a CRBT file is to be played, some real-time information (voice, data, media, and information) needs to be converted into a real-time CRBT file in real time if the real-time information is not a CRBT file. Moreover, since the real-time CRBT file sub-module 123 is adapted to store and acquire a corresponding real-time CRBT file, which is usually in a size of 500 K, the conversion sub-module 125 may share the real-time CRBT file with the real-time CRBT file sub-module 123 by file sharing to reduce a delay and realize file synchronization.

Meanwhile, the channel management module 12 may further include a customization sub-module 126 adapted to customize real-time CRBT information for the calling subscriber and the called subscriber, for example, the real-time CRBT information customized by the calling subscriber and the called subscriber respectively, and a play order of real-time CRBT files corresponding to the real-time CRBT information. For example, the subscriber customizes Channel 1, Channel 2, and Channel 3; the real-time CRBT file corresponding to Channel 1 is political news, the real-time CRBT file corresponding to Channel 2 is a weather forecast, and the real-time CRBT file corresponding to Channel 3 is music. The default real-time CRBT file to be played is the real-time CRBT file corresponding to Channel 2; the previous channel of Channel 2 is Channel 1, and the next channel of Channel 2 is Channel 3. Moreover, since the real-time CRBT information sub-module 122 is adapted to determine the real-time CRBT information to be played, long connection is used between the customization sub-module 126 and the real-time CRBT information sub-module 122 to reduce the delay and realize the information synchronization. The CRBT access information includes a mode of subscribing to the CRBT identifier by the called subscriber, in which the subscriber customizes the CRBT in the channel management module, and the HLR does not need to be changed.

Figure 2:
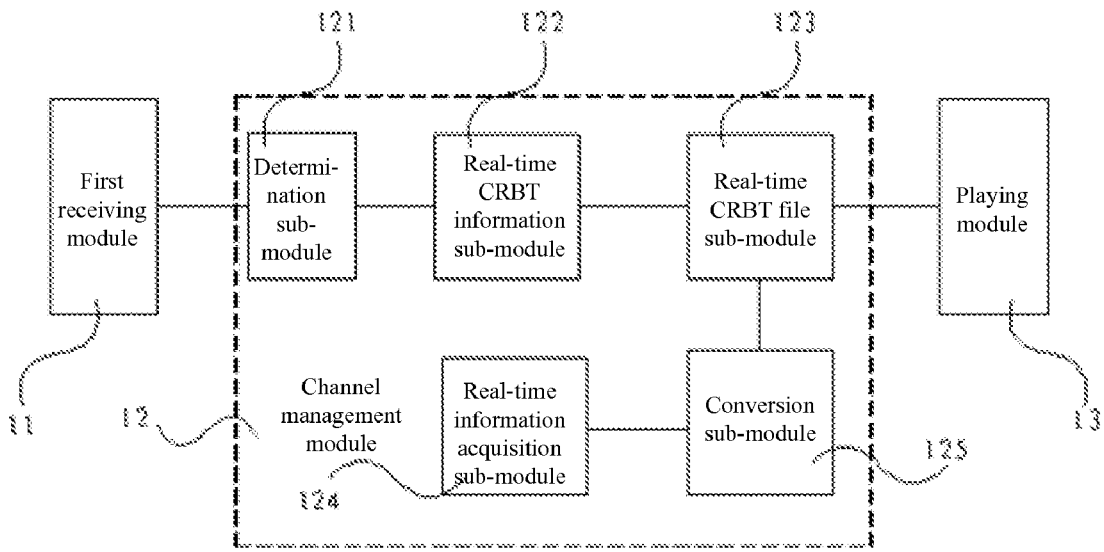
FIG. 2 is a schematic structural view of a device for implementing a CRBT service according to another embodiment of the invention.

FIG. 2 is a schematic structural view of the device for implementing a CRBT service according to another embodiment of the invention. Unlike the embodiment of FIG. 1, the CRBT access information in this embodiment includes a subscribed CRBT identifier of a calling subscriber, and the calling subscriber customizes a real-time CRBT service in the HLR. Since the CRBT access information has been determined to be the CRBT service customized by the calling party, the determination sub-module 121 of the channel management module 12 does not need to determine the priority. After the determination sub-module 121 determines to use the real-time CRBT service, the real-time CRBT information sub-module 122 determines calling real-time CRBT information according to the subscribed CRBT identifier of the calling subscriber, and the real-time CRBT file sub-module 123 acquires a calling real-time CRBT file according to the calling real-time CRBT information.

The channel management module 12 may further include a real-time information acquisition sub-module 124 and a conversion sub-module 125. The real-time information acquisition sub-module 124 is adapted to acquire real-time information from a real-time platform. The real-time platform may be a carrier such as a radio station, a TV station, or a website capable of providing real-time information. The real-time information includes news, weather forecasts, music, advertisements, and the like. The conversion sub-module 125 is adapted to convert the real-time information into a real-time CRBT file. As a CRBT file is to be played, some real-time information (voice, data, media, and information) needs to be converted into a real-time CRBT file in real time if the real-time information is not a CRBT file. For example, text/RM/MPEG4/MP3 and other formats are converted into a wave format by using the conventional art. Moreover, since the real-time CRBT file sub-module 123 is adapted to store and acquire a corresponding real-time CRBT file, which is usually in a size of 500 K, the conversion sub-module 125 may transmit the real-time CRBT file to the real-time CRBT file sub-module 123 by file sharing to reduce a delay and realize file synchronization. The CRBT access information includes a mode of subscribing to a real-time CRBT identifier by the calling subscriber, in which the subscriber customizes the CRBT in the HLR, and the HLR needs to be changed.

In this embodiment, a real-time update of the CRBT file that the calling subscriber hears is realized by customizing the real-time CRBT service.

The embodiments shown in FIG. 1 and FIG. 2 may further include a second receiving module adapted to receive selection information of the calling subscriber. The selection information may be sent by pressing keys. For example, when "1#" is pressed, it indicates that the calling subscriber wants to listen to the previous channel of the channel that is played currently; when "2#" is pressed, it indicates that the calling subscriber wants to listen to the next channel of the channel that is played currently; and when "3#" is pressed, it indicates that the calling subscriber wants to switch from listening to the real-time CRBT file to listening to a regular CRBT file, that is, a CRBT file pre-stored in a ringing tone library. At this time, the channel management module switches the CRBT file played currently to the CRBT file selected by the calling subscriber according to the selection information and the CRBT customized by the subscriber. In detail, for the real-time CRBT switching, upon receiving the selection information, the second receiving module judges that the selection information is for the switching of the real-time CRBT file, for example, "1#" or "2#", and then sends the selection information to the real-time CRBT information sub-module 122. The real-time CRBT information sub-module 122 determines the real-time CRBT information to be acquired according to the customization of the subscriber. The real-time CRBT file sub-module 123 determines a corresponding real-time CRBT file according to the real-time CRBT information. In the case of conversion from a real-time CRBT file to a regular CRBT file, upon receiving the selection information, the second receiving module judges that the selection information is for the conversion from a real-time CRBT file to a regular CRBT file, for example, "3#", and then acquires the corresponding regular CRBT file from a preset personal ringing tone library of the subscriber by using the conventional art.

Since the channel management module may switch the played CRBT file according to the selection information that the calling subscriber may send, the calling subscriber can independently switch the played CRBT file according to his/her demands, so that the CRBT that the calling subscriber hears is updated in real time.

In the embodiments, the real-time CRBT may be heard, and the real-time update of the CRBT may be realized, so as to avoid the problem that only a single CRBT can be played in the conventional art. Thus, abundant and varied CRBTs are provided, and the heard CRBT may be switched. Meanwhile, the customization of the service is charged, which brings benefits to the operator. In addition, since the real-time platform may play various information including music, news, advertisements, and the like, the CRBT service is changed from a pure playing platform in the conventional art into an information platform capable of playing a variety of information, so as to provide a way for developing new services, for example, the advertising service. Moreover, in this embodiment, it can be determined whether to play the real-time CRBT customized by the calling terminal or that by the called terminal, so that the calling terminal can hear the real-time CRBT that it customizes. In addition, in this embodiment, the played real-time CRBT can be changed according to the selection information when the calling terminal listens to the CRBT, so as to achieve the purpose of autonomously selecting the real-time CRBT.

Figure 3:
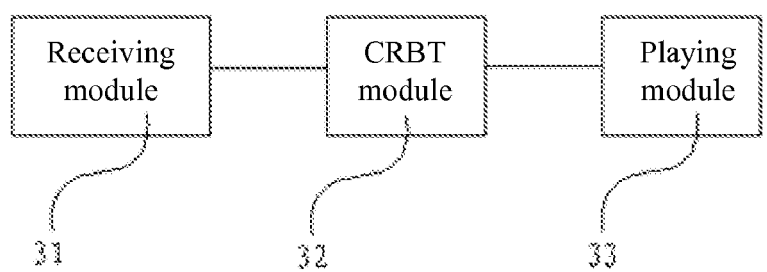
FIG. 3 is a schematic structural view of a device for implementing a CRBT service according to still another embodiment of the invention.

FIG. 3 is a schematic structural view of the device for implementing a CRBT service according to still another embodiment of the invention. This embodiment is used in a process for playing a first CRBT file to the calling subscriber, and includes a receiving module 31, a CRBT module 32, and a playing module 33. The receiving module 31 is adapted to receive selection information sent by a calling subscriber. The CRBT module 32 is adapted to determine a second CRBT file to be played according to the received selection information. The playing module 33 is adapted to play the second CRBT file to the calling subscriber.

The CRBT module 32 has CRBTs and a play order of the CRBTs customized by a subscriber. For example, the subscriber customizes Channel 1, Channel 2, and Channel 3; the real-time CRBT file corresponding to Channel 1 is political news, the real-time CRBT file corresponding to Channel 2 is a weather forecast, and the real-time CRBT file corresponding to Channel 3 is music. The default real-time CRBT file to be played is the real-time CRBT file corresponding to Channel 2; the previous channel of Channel 2 is Channel 1, and the next channel of Channel 2 is Channel 3. The selection information may be sent by pressing keys. For example, when "1#" is pressed, it indicates that the calling subscriber wants to listen to the previous channel of the channel that is played currently; when "2#" is pressed, it indicates that the calling subscriber wants to listen to the next channel of the channel that is played currently; and when "3#" is pressed, it indicates that the calling subscriber wants to switch from listening to the real-time CRBT file to listening to a regular CRBT file, that is, a CRBT file pre-stored in a ringing tone library. The CRBT module 32 determines the second CRBT file to be played according to the selection information and the CRBTs and play order customized by the subscriber, and then switches the played CRBT file from the first CRBT file to the second CRBT file. If the first CRBT file that is played currently is a weather forecast, the second CRBT file, that is, music will be played after the subscriber presses "2#".

The first and second CRBT files may both be real-time CRBT files or both be regular CRBT files, that is, the selection information is adapted to implement the switching between CRBT files of the same type. Or, the first CRBT file is a real-time CRBT file and the second CRBT file is a regular CRBT file, that is, the calling subscriber does not want to listen to a real-time CRBT file but wants to listen to a regular CRBT file in the ringing tone library. At this time, the selection information is adapted to implement the switching from the real-time CRBT file to the regular CRBT file.

In this embodiment, the real-time update of the CRBT file that the calling subscriber hears is realized by autonomously switching the heard CRBT file according to the selection of the calling subscriber.

In addition, this embodiment may realize the playing of the real-time CRBT file, that is, this embodiment further includes a channel management module adapted to determine a real-time CRBT file according to the selection information. In detail, the channel management module includes a real-time information acquisition sub-module and a conversion sub-module. The real-time information acquisition sub-module is adapted to acquire real-time information from a real-time platform according to the selection information. For example, if the current playing channel is Channel 2, and when "1#" is pressed, it indicates that Channel 1 is to be heard, that is, the real-time CRBT information (Channel 1) to be heard is determined according to the selection information ("1#"). If the acquired real-time information corresponding to Channel 1 is political news, the real-time information acquired by the real-time information acquisition sub-module from the real-time platform is political news. The real-time platform may be a carrier such as a radio station, a TV station, or a website capable of providing real-time information. The real-time information includes news, weather forecasts, music, advertisements, and the like. The conversion sub-module is adapted to convert the real-time information into a real-time CRBT file. As the subscriber listens to a CRBT file, some real-time information (voice, data, media, and information) needs to be converted into a real-time CRBT file in real time if the real-time information is not a CRBT file. For example, text/RM/MPEG4/MP3 and other formats are converted into a wav format by using the conventional art.

Figure 4:
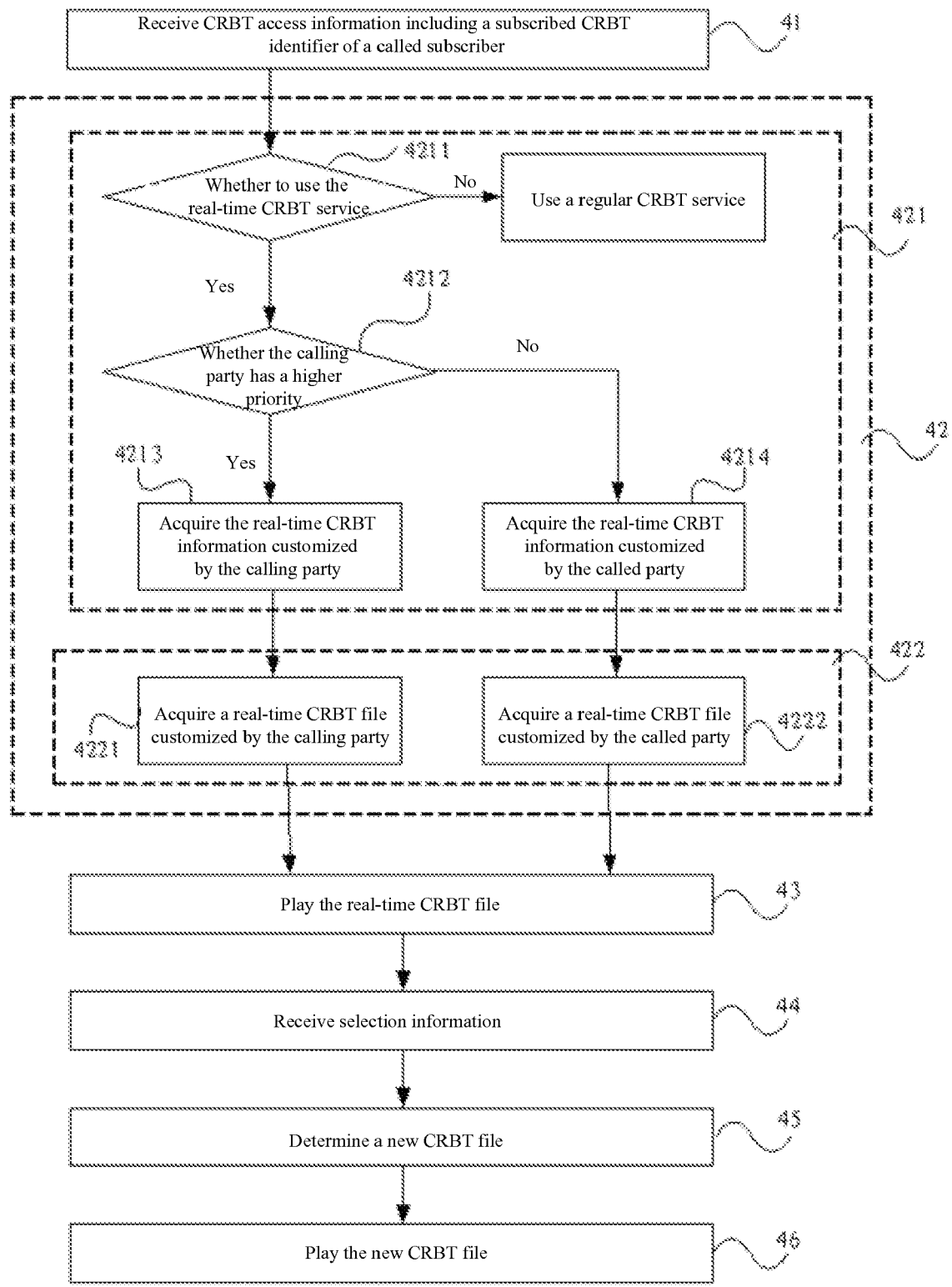
FIG. 4 is a flow chart of a method for implementing a CRBT service according to an embodiment of the invention.

FIG. 4 is a flow chart of a method for implementing a CRBT service according to an embodiment of the invention. This embodiment includes the following steps.

Step 41: CRBT access information is received.

Step 42: A real-time CRBT file is determined according to the CRBT access information.

Step 43: The real-time CRBT file is played to a calling subscriber.

Step 42 further includes the following steps.

Step 421: Real-time CRBT information customized by a subscriber is determined according to the CRBT access information.

Step 422: The real-time CRBT file is determined according to the real-time CRBT information.

The CRBT access information includes a subscribed CRBT identifier of a called subscriber acquired from an HLR. The subscriber sets a customized service on the channel management module, for example, a real-time CRBT service customized by a called subscriber, a priority for a calling party and a called party to customize a real-time CRBT service, that is, whether the real-time CRBT service customized by the calling subscriber or the real-time CRBT service customized by the called subscriber has a higher priority, the real-time CRBT information customized by the calling party and the called party respectively, a play order of real-time CRBT files corresponding to the real-time CRBT information, and the like. At this time, Step 421 further includes the following steps.

Step 4211: It is judged whether to use the real-time CRBT service according to the subscribed CRBT identifier of the called subscriber; if the real-time CRBT service is used, Step 4212 is performed; otherwise, a regular CRBT service is used as in the conventional art.

Step 4212: A priority for the calling subscriber and the called subscriber to customize a real-time CRBT is determined according to the subscribed identifier of the called subscriber, and it is judged whether the calling party has a higher priority according to the priority; if the calling party has a higher priority, Step 4213 is performed; otherwise, Step 4214 is performed.

Step 4213: The real-time CRBT information customized by the calling subscriber is acquired, and Step 4221 is performed.

Step 4214: The real-time CRBT information customized by the called subscriber is acquired, and Step 4222 is performed.

Step 422 further includes the following steps.

Step 4221: A calling real-time CRBT file customized by the calling subscriber is determined according to the real-time CRBT information customized by the calling subscriber, and Step 43 is performed.

Step 4222: A called real-time CRBT file customized by the called subscriber is determined according to the real-time CRBT information customized by the called subscriber, and Step 43 is performed.

Step 43: The determined calling real-time CRBT file or called real-time CRBT file is played.

In this embodiment, the CRBT access information is the subscribed CRBT identifier of the called subscriber, the subscriber customizes the CRBT in the channel management module, and the HLR does not need to be changed.

Figure 5:
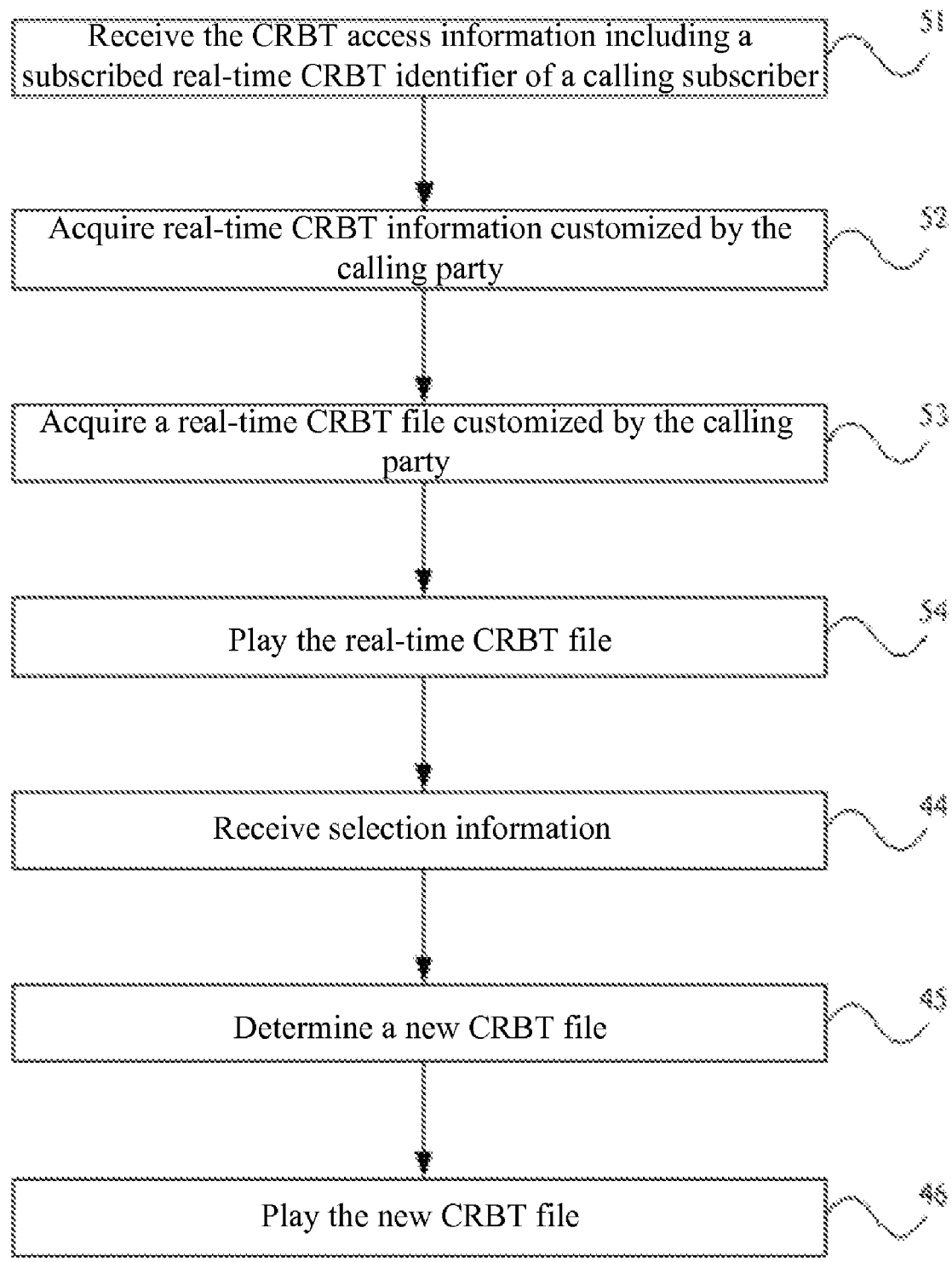
FIG. 5 is a flow chart of a method for implementing a CRBT service according to another embodiment of the invention.

FIG. 5 is a flow chart of the method for implementing a CRBT service according to another embodiment of the invention. Unlike the embodiment of FIG. 4, in this embodiment, the calling subscriber customizes a real-time CRBT service in the HLR, and at this time, the CRBT access information includes a subscribed real-time CRBT identifier of a calling subscriber. Since the CRBT access information has been determined to be the real-time CRBT service customized by the calling party, it is unnecessary to judge whether to use the CRBT service and to judge the priority. In particular, this embodiment includes the following steps.

Step 51: The CRBT access information including the subscribed real-time CRBT identifier of the calling subscriber is received.

Step 52: Real-time CRBT information customized by the calling subscriber is acquired according to the subscribed real-time CRBT identifier of the calling subscriber.

Step 53: A calling real-time CRBT file corresponding to the real-time CRBT information customized by the calling subscriber is determined according to the real-time CRBT information customized by the calling subscriber.

Step 54: The calling real-time CRBT file is played to the calling subscriber.

In this embodiment, the CRBT access information is the subscribed real-time CRBT identifier of the calling subscriber, the subscriber customizes the CRBT in the HLR, and the HLR needs to be changed.

In the embodiments shown in FIG. 4 and FIG. 5, the real-time update of the CRBT file that the calling subscriber hears is realized by customizing the real-time CRBT service.

The embodiments shown in FIG. 4 and FIG. 5 may further include the following steps.

Step 44: Selection information of the calling subscriber is received.

Step 45: A new CRBT file is determined according to the selection information.

Step 46: The new CRBT file is played to the calling subscriber.

The selection information is adapted to switch a real-time CRBT file or to acquire a regular CRBT file. For example, the selection information may be sent by pressing keys. For example, when "1#" is pressed, it indicates that the calling subscriber wants to listen to the previous channel of the channel that is played currently; when "2#" is pressed, it indicates that the calling subscriber wants to listen to the next channel of the channel that is played currently; and when "3#" is pressed, it indicates that the calling subscriber wants to switch from listening to a real-time CRBT file to listening to a regular CRBT file, that is, a CRBT file pre-stored in a ringing tone library. The CRBT module determines the new CRBT file to be played according to the selection information and the CRBTs and play order customized by the subscriber, and then switches the CRBT file that is played currently to the new CRBT file. If the CRBT file that is played currently is a weather forecast, the new CRBT file, for example, music will be played after the subscriber presses "2#".

The calling subscriber autonomously selects the played CRBT file according to the selection information, so as to realize the real-time update of the heard CRBT file.

In the embodiments, the real-time CRBT may be heard, and the real-time update of the CRBT may be realized, so as to avoid the problem that only a single CRBT can be played in the conventional art. Thus, abundant rich and varied CRBTs are provided, and the heard CRBT may be switched. Meanwhile, the customization of the service is charged, which brings benefits to the operator. In addition, since the real-time platform can play various information including music, news, advertisements, and the like, the CRBT service is changed from a pure playing platform in the existing systems into an information platform capable of playing a variety of information, so as to provide a way for developing new services, for example, the advertising service. Moreover, in this embodiment, it can be determined whether to play the real-time CRBT customized by the calling terminal or that customized by the called terminal, so that the calling terminal can hear the real-time CRBT that it customizes. In addition, in this embodiment, the played real-time CRBT may be changed according to the selection information when the calling terminal listens to the CRBT, so as to achieve the purpose of autonomously selecting the real-time CRBT.

Figure 6:
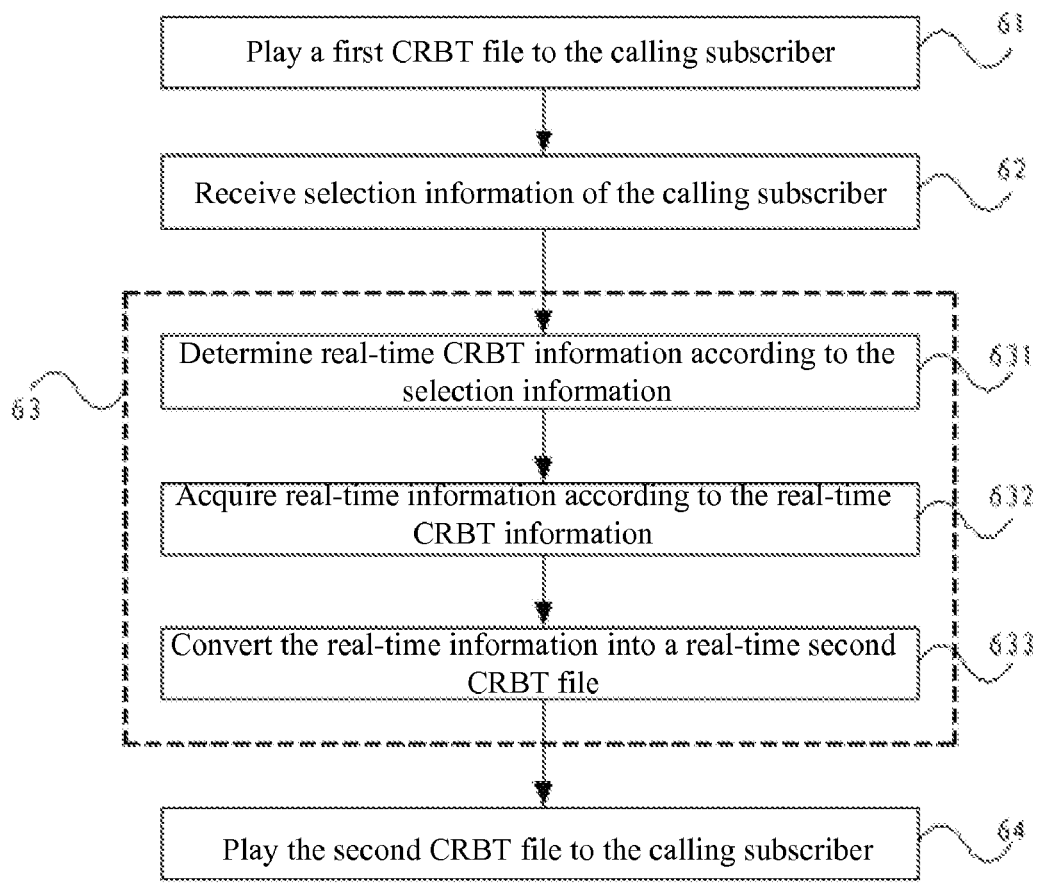
FIG. 6 is a flow chart of a method for implementing a CRBT service according to still another embodiment of the invention.

FIG. 6 is a flow chart of the method for implementing a CRBT service according to still another embodiment of the present invention. The embodiment includes the following steps.

Step 61: A first CRBT file is played to the calling subscriber.

Step 62: Selection information sent by the calling subscriber is received. The selection information may be sent by pressing keys, for example, "1#", "2#", and the like.

Step 63: A second CRBT file to be played is determined according to the received selection information. The CRBT module has CRBTs and a play order of the CRBTs customized by a subscriber. For example, the subscriber customizes Channel 1, Channel 2, and Channel 3; the real-time CRBT file corresponding to Channel 1 is political news, the real-time CRBT file corresponding to Channel 2 is a weather forecast, and the real-time CRBT file corresponding to Channel 3 is music. The default real-time CRBT file to be played is the real-time CRBT file corresponding to Channel 2. The previous channel of Channel 2 is Channel 1, and the next channel of Channel 2 is Channel 3. The selection information may be sent by pressing keys. For example, when "1#" is pressed, it indicates that the calling subscriber wants to listen to the previous channel of the channel that is played currently; when "2#" is pressed, it indicates that the calling subscriber wants to listen to the next channel of the channel that is played currently; and when "3#" is pressed, it indicates that the calling subscriber wants to switch from listening to a real-time CRBT file to listening to a regular CRBT file, that is, a CRBT file pre-stored in a ringing tone library. The CRBT module determines the second CRBT file to be played according to the selection information and the CRBTs and play order customized by the subscriber, and then switches the played CRBT file from the first CRBT file to the second CRBT file. If the first CRBT file that is played currently is a weather forecast, the second CRBT file, that is, music will be played after the subscriber presses "2#".

Step 64: The second CRBT file is played to the calling subscriber.

The first and second CRBT files may both be real-time CRBT files or both be regular CRBT files, that is, the selection information is adapted to implement the switching between CRBT files of the same type. Or, the first CRBT file is a real-time CRBT file and the second CRBT file is a regular CRBT file, that is, the calling subscriber does not want to listen to a real-time CRBT file but wants to listen to a regular CRBT file in the ringing tone library. At this time, the selection information is adapted to implement the switching from the real-time CRBT file to the regular CRBT file.

In this embodiment, the real-time update of the CRBT file that the calling subscriber hears is realized by autonomously switching the heard CRBT file through the selection of the calling subscriber.

In addition, to implement the playing of the real-time CRBT file, the second CRBT file in Step 63 of this embodiment is a real-time CRBT file. In detail, the step of determining the real-time CRBT file further includes the following steps.

Step 631: Real-time CRBT information is determined according to the selection information. If the channel that is played currently is Channel 2, the key "1#" is pressed to indicate that Channel 1 is to be heard, that is, the real-time CRBT information (Channel 1) to be heard is determined according to the selection information ("1#").

Step 632: Real-time information is acquired from a real-time platform according to the real-time CRBT information. For example, the real-time information (political news) corresponding to Channel 1 is acquired. The real-time platform may be a carrier such as a radio station, a TV station, or a website capable of providing real-time information. The real-time information includes news, weather forecasts, music, advertisements, and the like.

Step 633: The real-time information is converted into a real-time CRBT file, that is, the second CRBT file is the real-time CRBT file. As the subscriber listens to a CRBT file, some real-time information (voice, data, media, and information) needs to be converted into a real-time CRBT file in real time if the real-time information is not a CRBT file. For example, text/RM/MPEG4/MP3 and other formats are converted into a wav format by using the conventional art.

In the embodiments of the invention, the CRBT heard by the calling subscriber may be updated in real time through customization of the real-time CRBT service, so as to avoid the problem that only a single CRBT can be played and abundant and varied CRBTs cannot be provided in the conventional art. Meanwhile, the customization of the service is charged, which brings benefits to the operator. In addition, since the real-time platform can play various information including music, news, advertisements, and the like, the CRBT service is changed into an information platform capable of playing a variety of information, so as to provide a way for developing new services, for example, the advertising service.

Furthermore, in the embodiment of the invention, when the calling subscriber listens to the CRBT, the played CRBT file may be changed according to the selection information to realize the autonomous selection of the calling subscriber, so as to implement the real-time update of the CRBT file that the calling subscriber hears in another way.

Figure 7:
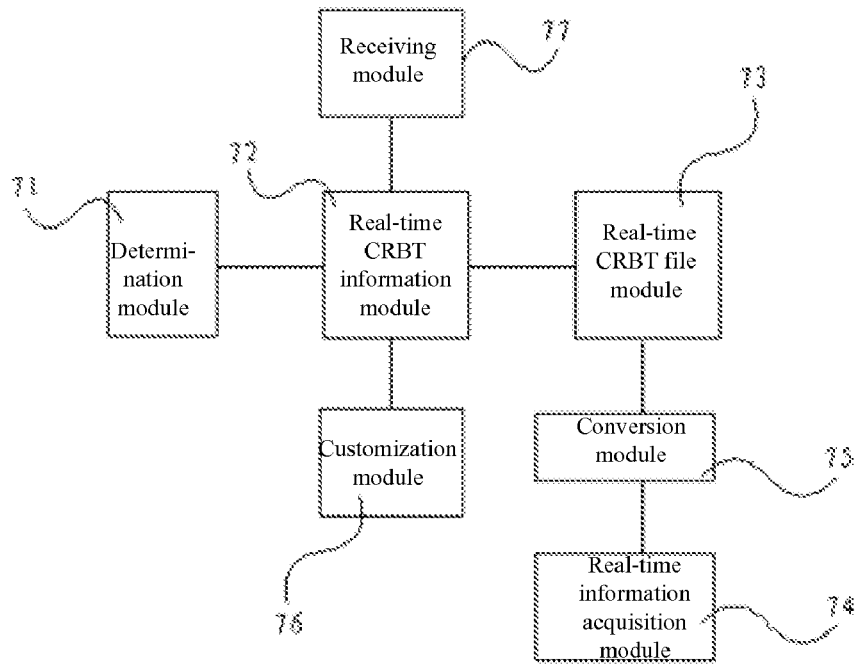
FIG. 7 is a schematic structural view of a device for acquiring a CRBT file according to an embodiment of the invention.

FIG. 7 is a schematic structural view of a device for acquiring a CRBT file according to an embodiment of the invention. The embodiment includes a determination module 71, a real-time CRBT information module 72, and a real-time CRBT file module 73. The determination module 71 is adapted to determine whether to use a real-time CRBT service according to a subscribed CRBT identifier of a subscriber. The real-time CRBT information module 72 is adapted to determine real-time CRBT information according to a real-time CRBT identifier of the subscriber. The real-time CRBT file module 73 is adapted to determine a real-time CRBT file according to the real-time CRBT information.

The subscribed CRBT identifier of the subscriber may be a subscribed CRBT identifier of a called subscriber acquired from an HLR. The subscriber sets a customized service on the device for acquiring the CRBT file, for example, whether a called subscriber customizes a real-time CRBT service, a priority for a calling party and the called party to customize a real-time CRBT service, that is, whether the real-time CRBT service customized by the calling subscriber or the real-time CRBT service customized by the called subscriber has a higher priority, the real-time CRBT information customized by the calling party and the called party respectively, an acquisition order of the real-time CRBT files corresponding to the real-time CRBT information, and the like.

At this time, the determination module 71 is adapted to determine whether to use a real-time CRBT service and a priority for the calling subscriber and the called subscriber to customize a real-time CRBT according to the subscribed CRBT identifier of the called subscriber. The real-time CRBT information module 72 is adapted to determine real-time CRBT information according to the priority for the calling subscriber and the called subscriber to customize the real-time CRBT, that is, to acquire the real-time CRBT information customized by the calling party when the calling party has a higher priority, and to acquire the real-time CRBT information customized by the called party when the called party has a higher priority. The real-time CRBT file module 73 is adapted to store a real-time CRBT file and determine the real-time CRBT file according to the real-time CRBT information, that is, to acquire a calling real-time CRBT file corresponding to the real-time CRBT information customized by the calling subscriber when the calling party has a higher priority, and to acquire a called real-time CRBT file corresponding to the real-time CRBT information customized by the called subscriber when the called party has a higher priority.

This embodiment may further include a real-time information acquisition module 74 and a conversion module 75. The real-time information acquisition module 74 is adapted to acquire real-time information from a real-time platform. The real-time platform may be a carrier such as a radio station, a TV station, or a website capable of providing real-time information. The real-time information includes news, weather forecasts, music, advertisements, and the like. The conversion module 75 is adapted to convert the real-time information into a real-time CRBT file. Since a CRBT file is to be played, some real-time information (voice, data, media, and information) needs to be converted into a real-time CRBT file in real time if the real-time information is not a CRBT file. For example, text/RM/MPEG4/MP3 and other formats are converted into a wav format by using the conventional art. Moreover, since the real-time CRBT file module 73 is adapted to store and acquire a corresponding real-time CRBT file, which is usually in a size of 500 K, the conversion module 75 may share the real-time CRBT file with the real-time CRBT file module 73 by file sharing manner to reduce a delay and realize file synchronization.

Meanwhile, the embodiment may further include a customization module 76 adapted to customize real-time CRBT information for the calling subscriber and the called subscriber, for example, the real-time CRBT information customized by the calling subscriber and the called subscriber respectively, and an acquisition order of real-time CRBT files corresponding to the real-time CRBT information. For example, the subscriber customizes Channel 1, Channel 2, and Channel 3; the real-time CRBT file corresponding to Channel 1 is political news, the real-time CRBT file corresponding to Channel 2 is a weather forecast, and the real-time CRBT file corresponding to Channel 3 is music. The default real-time CRBT file to be acquired is the real-time CRBT file corresponding to Channel 2; the previous channel of Channel 2 is Channel 1, and the next channel of Channel 2 is Channel 3. Moreover, since the real-time CRBT information module 72 is adapted to determine the real-time CRBT information to be acquired, a long connection is used between the customization module 76 and the real-time CRBT information module 72 to reduce the delay and realize the information synchronization. The subscribed CRBT identifier of the subscriber is a mode of subscribing to a CRBT identifier by the called subscriber, in which the subscriber customizes the CRBT in the device for acquiring the CRBT file, and the HLR does not need to be changed.

In this embodiment, the subscribed CRBT identifier of the subscriber may be a subscribed CRBT identifier of a calling subscriber, and the calling subscriber customizes a real-time CRBT service in the HLR. Unlike the subscribed CRBT identifier of the called subscriber, as the subscribed CRBT identifier of the subscriber has been determined to be the CRBT service customized by the calling party, the determination module does not need to determine the priority. After the determination module 71 determines to use the real-time CRBT service, the real-time CRBT information module 72 determines calling real-time CRBT information according to the subscribed CRBT identifier of the calling subscriber, and the real-time CRBT file module 73 acquires a calling real-time CRBT file according to the calling real-time CRBT information. Meanwhile, since the service is customized in the HLR, the customization module is not needed. The subscribed CRBT identifier of the subscriber is a mode of subscribing to the CRBT identifier by the calling subscriber, in which the subscriber customizes the CRBT in the HLR, and the HLR needs to be changed.

In this embodiment, the real-time CRBT file is acquired by customizing the real-time CRBT service.

This embodiment may further include a receiving module 77. The receiving module 77 is adapted to receive selection information of the subscriber. The selection information may be sent by pressing keys. For example, when "1#" is pressed, it indicates that the subscriber wants to acquire the previous file of the current real-time CRBT file; when "2#" is pressed, it indicates that the subscriber wants to acquire the next file of the current real-time CRBT file; and when "3#" is pressed, it indicates that the subscriber wants to switch from acquiring the real-time CRBT file to acquiring a regular CRBT file, that is, a CRBT file pre-stored in a ringing tone library.

For the real-time CRBT switching, upon receiving the selection information, the receiving module 77 judges that the selection information is for the switching of the real-time CRBT file, for example, "1#" or "2#", and then sends the selection information to the real-time CRBT information module 72. The real-time CRBT information module 72 determines the real-time CRBT information to be acquired according to the customization of the subscriber. The real-time CRBT file module 73 determines a corresponding real-time CRBT file according to the real-time CRBT information.

In the case of conversion from a real-time CRBT file to a regular CRBT file, upon receiving the selection information, the receiving module 77 judges that the selection information is for the conversion from a real-time CRBT file to a regular CRBT file, for example, "3#", and then acquires the corresponding regular CRBT file from a preset personal ringing tone library of the subscriber by using the conventional art.

The receiving module receives the selection information of the subscriber, so that the subscriber can autonomously change the CRBT file to be acquired.

In the embodiments of the invention, the real-time CRBT file may be acquired by customizing the real-time CRBT service, so that the CRBT file that the subscriber hears is updated in real time, so as to implement a form of real-time CRBT service; besides, the CRBT file to be acquired may be changed autonomously according to the selection information, so that the CRBT file is updated autonomously, so as to implement another form of real-time CRBT service.

In the embodiments of the invention, the calling subscriber may hear the CRBT that is updated in real time by acquiring the real-time CRBT file; besides, in the process for playing the CRBT, the played CRBT may be switched according to the selection information sent by the calling subscriber to realize the autonomous selection of the calling subscriber, so as to implement the real-time update of the CRBT that the calling subscriber hears in another manner; moreover, the update of the CRBT file that the calling subscriber hears may be realized by combining the modes of acquiring the real-time CRBT file and sending the selection information. Thus, the problem that only a single CRBT can be played and abundant and varied CRBTs cannot be provided in the existing systems may be avoided by providing real-time CRBTs to the calling subscriber. Meanwhile, a customization is needed for acquiring the real-time CRBT file, and the customization of the service is charged, which brings benefits to the operator. In addition, since the real-time platform of the real-time service provider can play various information including music, news, advertisements, and the like, the CRBT service is changed from the pure playing platform in the existing systems into an information platform capable of playing a variety of information, so as to provide a way for developing new services, for example, the advertising service.

It is apparent to those of ordinary skill in the art that, all or part of steps in the method according to the previous embodiments may be achieved through related hardware according to instructions from a program. The program may be stored in a computer readable storage media, for example, an ROM/RAM, a magnetic disk, or an optical disk.

Finally, it should be noted that, the embodiments are merely used to describe the technical solutions of the present invention, but are not intended to limit the scope of present invention. It will be apparent to those of ordinary skill in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A device for implementing a Coloring Ring Back Tone (CRBT) service, comprising:
   a first receiving module adapted to receive CRBT access information;
   a channel management module adapted to determine a real-time CRBT file according to the CRBT access information; and
   a playing module adapted to play the real-time CRBT file;
   wherein the channel management module comprises:
   a determination sub-module adapted to determine whether to use a real-time CRBT service according to the CRBT access information;
   a real-time CRBT information sub-module adapted to determine real-time CRBT information according to the CRBT access information; and
   a real-time CRBT file sub-module adapted to determine the real-time CRBT file according to the real-time CRBT information.

2. The device for implementing a CRBT service according to claim 1, wherein
   the determination sub-module is further adapted to determine a priority for a calling subscriber and a called subscriber to customize a real-time CRBT according to the CRBT access information; and
   the real-time CRBT information sub-module is further adapted to determine the real-time CRBT information according to the priority for the calling subscriber and the called subscriber to customize the real-time CRBT, and the real-time CRBT information is calling real-time CRBT information or called real-time CRBT information.

3. The device for implementing a CRBT service according to claim 1, wherein the channel management module further comprises:
   a real-time information acquisition sub-module, adapted to acquire real-time information from a real-time platform; and
   a conversion sub-module, adapted to convert the real-time information into the real-time CRBT file.

4. The device for implementing a CRBT service according to claim 1, further comprising a customization sub-module adapted to customize the real-time CRBT information by a calling subscriber and a called subscriber.

5. The device for implementing a CRBT service according to claim 1, further comprising a second receiving module adapted to receive selection information of the calling subscriber.

6. The device for implementing a CRBT service according to claim 5, wherein
   the real-time CRBT information sub-module is further adapted to determine new real-time CRBT information according to the selection information; and
   the real-time CRBT file sub-module is further adapted to determine a new real-time CRBT file according to the new real-time CRBT information.

7. The device for implementing a CRBT service according to claim 5, wherein
   the selection information is adapted to instruct the channel management module to acquire a regular CRBT file; and
   the playing module is further adapted to play the regular CRBT file.

8. A method for implementing a Coloring Ring Back Tone (CRBT) service, comprising:
   receiving CRBT access information;
   determining a real-time CRBT file according to the CRBT access information; and
   playing the real-time CRBT file to a calling subscriber;
   wherein the determining the real-time CRBT file according to the CRBT access information comprises: determining real-time CRBT information customized by a subscriber according to the CRBT access information and determining the real-time CRBT file according to the real-time CRBT information; the CRBT access information comprises a subscribed CRBT identifier of a called subscriber; and the determining the real-time CRBT information customized by the subscriber according to the CRBT access information comprises:
   judging whether to use a real-time CRBT service according to the subscribed CRBT identifier of the called subscriber and determining a priority for the calling subscriber and a called subscriber to customize a real-time CRBT according to the subscribed identifier of the called subscriber if the real-time CRBT service is used; and
   judging whether a calling party has a higher priority according to the priority, acquiring the real-time CRBT information customized by the calling subscriber if the calling party has a higher priority; otherwise, acquiring the real-time CRBT information customized by the called subscriber.

9. The method for implementing a CRBT service according to claim 8, further comprising:
receiving selection information of the calling subscriber;
determining a new CRBT file according to the selection information; and
playing the new CRBT file to the calling subscriber.

10. The method for implementing a CRBT service according to claim 9, wherein the selection information is adapted to switch the real-time CRBT file or acquire a regular CRBT file.

11. A device for acquiring a Coloring Ring Back Tone (CRBT) file, comprising:
a determination module adapted to determine whether to use a real-time CRBT service according to a subscribed CRBT identifier of a subscriber;
a real-time CRBT information module adapted to determine real-time CRBT information according to a real-time CRBT identifier of the subscriber; and
a real-time CRBT file module adapted to determine a real-time CRBT file according to the real-time CRBT information; wherein
the determination module is further adapted to determine a priority for a calling subscriber and a called subscriber to customize a real-time CRBT according to the subscribed CRBT identifier of the subscriber; and
the real-time CRBT information module is further adapted to determine the real-time CRBT information according to the priority for the calling subscriber and the called subscriber to customize the real-time CRBT, and the real-time CRBT information is calling real-time CRBT information or called real-time CRBT information.

12. The device for acquiring a CRBT file according to claim 11, further comprising:
a real-time information acquisition module adapted to acquire real-time information from a real-time platform; and
a conversion module adapted to convert the real-time information into the real-time CRBT file.

13. The device for acquiring a CRBT file according to claim 11, further comprising a customization module adapted to customize the real-time CRBT information by the calling subscriber and the called subscriber.

14. The device for acquiring a CRBT file according to claim 11, further comprising a receiving module adapted to receive selection information of the subscriber; wherein
the real-time CRBT information module is further adapted to determine new real-time CRBT information according to the selection information; and
the real-time CRBT file module is further adapted to determine a new real-time CRBT file according to the new real-time CRBT information.

15. The device for acquiring a CRBT file according to claim 14, wherein the selection information is adapted to instruct a channel management module to acquire a regular CRBT file.

16. A method for implementing a Coloring Ring Back Tone (CRBT) service, comprising:
receiving CRBT access information;
determining a real-time CRBT file according to the CRBT access information; and
playing the real-time CRBT file to a calling subscriber;
wherein the determining the real-time CRBT file according to the CRBT access information comprises: determining real-time CRBT information customized by a subscriber according to the CRBT access information and determining the real-time CRBT file according to the real-time CRBT information; the CRBT access information comprises a subscribed CRBT identifier of the calling subscriber; and the determining the real-time CRBT information customized by the subscriber according to the CRBT access information comprises:
judging whether to use a real-time CRBT service according to the subscribed CRBT identifier of the calling subscriber, and determining the real-time CRBT information customized by the calling subscriber according to the subscribed CRBT identifier of the calling subscriber if the real-time CRBT service is used.

17. The method for implementing a CRBT service according to claim 16, further comprising:
receiving selection information of the calling subscriber;
determining a new CRBT file according to the selection information; and
playing the new CRBT file to the calling subscriber.

18. The method for implementing a CRBT service according to claim 17, wherein the selection information is adapted to switch the real-time CRBT file or acquire a regular CRBT file.

* * * * *